United States Patent [19]

Nagao et al.

[11] Patent Number: 5,205,349
[45] Date of Patent: Apr. 27, 1993

[54] HEAT EXCHANGER BRACKET MOUNTING STRUCTURE

[75] Inventors: Teruyuki Nagao, Higashimatsuyama; Yoshikiyo Nagasaka, Kohnan, both of Japan

[73] Assignee: Zexel Corporation, Tokyo, Japan

[21] Appl. No.: 886,812

[22] Filed: May 22, 1992

[30] Foreign Application Priority Data

May 23, 1991 [JP] Japan ............................. 3-46436[U]

[51] Int. Cl.⁵ .......................... F28F 9/00; B60K 11/04
[52] U.S. Cl. ..................................... 165/67; 165/153; 180/68.4
[58] Field of Search ......................... 165/67, 153, 173; 180/68.4; 248/232, 233

[56] References Cited

U.S. PATENT DOCUMENTS

| | | | |
|---|---|---|---|
| 3,213,931 | 10/1965 | Hilicki | 165/67 |
| 4,196,774 | 4/1980 | Hoffmann | 165/67 |
| 4,569,390 | 2/1986 | Knowlton et al. | 165/153 |
| 4,678,026 | 7/1987 | Lenz et al. | 165/67 |
| 4,903,389 | 2/1990 | Wolf | 165/153 |
| 4,938,284 | 7/1990 | Howells | 165/153 |
| 5,036,914 | 8/1991 | Nishishita et al. | 165/153 |
| 5,052,480 | 10/1991 | Nakajima et al. | 165/153 |
| 5,069,275 | 12/1991 | Suzuki et al. | 165/67 |
| 5,107,926 | 4/1992 | Calleson | 165/153 |

FOREIGN PATENT DOCUMENTS

| | | |
|---|---|---|
| 2304883 | 8/1974 | Fed. Rep. of Germany ........ 165/67 |
| 142585 | 9/1988 | Japan . |
| 25693 | 1/1990 | Japan . |
| 217160 | 8/1990 | Japan . |
| 70994 | 3/1991 | Japan ..................................... 165/67 |
| 164694 | 7/1991 | Japan ..................................... 165/67 |

Primary Examiner—John Rivell
Assistant Examiner—L. R. Leo
Attorney, Agent, or Firm—Breneman & Georges

[57] ABSTRACT

A structure for mounting a bracket used to mount a heat exchanger 1 in which a plurality of tubes 9 are interposed between a pair of header pipes 2, 3 and a plurality of radiator fins 10 are interposed respectively between the tubes 9, or used to mount a pipe which is provided in such heat exchanger 1. In the structure, each of the header pipes 2, 3 includes a trough-shaped tank plate 5 in the outer side thereof and the tank plate 5 includes engagement means in the end portion thereof. A bracket 16 is mounted to the peripheral surface of the tank plate 5. The bracket 16 includes a pair of holding portions 17a, 18a which can hold therebetween the two end portions of the tank plate 5. Each of the holding portions 17a, 18a includes engagement means which is engageable or fittable with the engagement means in the tank plate 5.

20 Claims, 9 Drawing Sheets

F I G. 5
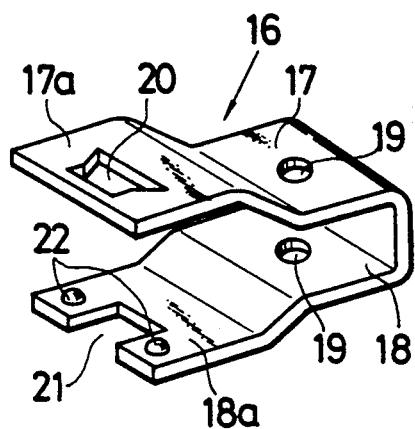
F I G. 6
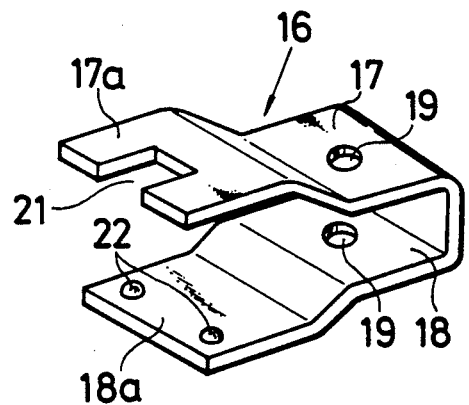
F I G. 7
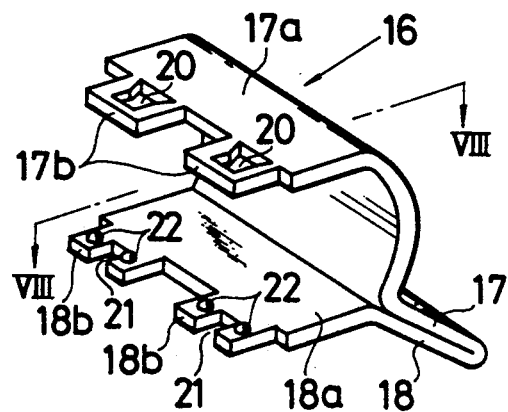

HEAT EXCHANGER BRACKET MOUNTING STRUCTURE

BACKGROUND OF THE INVENTION

1. Field of the Invention

The present invention relates to a bracket mounting structure in a heat exchanger employed in air conditioning equipment or in an automobile, which mounting structure is able to position and provisionally secure or mount a bracket with respect to a header pipe of the heat exchanger reasonably and easily.

2. Description of the Prior Art

A heat exchanger employed in air conditioning equipment or in an automobile is generally mounted by a bracket and the bracket is mounted on the peripheral surface of a header pipe of the heat exchanger, as disclosed in Japanese Utility Model Publication No. 63-142585 of Showa, and Japanese Patent Publications Nos. 2-25693 and 2-217160 of Heisei, for example.

In mounting the bracket, conventionally, the bracket is positioned at a predetermined position of the header pipe by use of a jig or the like, then the bracket is provisionally secured by use of rivets or clips or by welding in part, and thereafter the bracket is put into a brazing furnace or the like, in which the bracket is brazed to the header pipe.

However, the conventional mounting method requires the jig or the like for positioning of the bracket. Also, due to the fact, as means for provisionally securing the bracket to the header pipe, the rivets or clips are used or the bracket is soldered in part, the conventional mounting method requires various tools and parts. In addition, the above-mentioned operations take much time and labor, which results in poor productivity.

SUMMARY OF THE INVENTION

The present invention aims at eliminating the drawbacks found in the above-mentioned conventional bracket mounting method.

Accordingly, it is an object of the invention to provide a heat exchanger bracket mounting structure which is able to position and provisionally mount a bracket with respect to a header pipe reasonably and easily.

It is another object of the invention to provide a heat exchanger bracket mounting structure which can improve the accuracy of positioning of a bracket with respect to a header pipe as well as the strength of provisional securing or mounting of the bracket.

It is still another object of the invention to provide a new heat exchanger bracket mounting structure which includes various brackets for mounting a heat exchanger and a method for mounting the brackets.

It is yet another object of the invention to provide a new heat exchanger bracket mounting structure which includes brackets for mounting various pipes used to mount a refrigerant conduit and a water supply pipe provided in the heat exchanger and a method for mounting the brackets.

It is still another object of the invention to provide a heat exchanger bracket mounting structure which is able to improve the productivity of the above-mentioned bracket provisional securing operation.

A heat exchanger bracket mounting structure according to the invention is provided for use in a heat exchanger which includes a plurality of tubes interposed between a pair of header pipes and radiation fins respectively interposed between said tubes and, in the present heat exchanger bracket mounting structure, each of the header pipes includes a pipe-shaped tank plate in the outside thereof, the tank plate includes engagement means in the end portion thereof, a bracket is mounted on the peripheral surface of the tank plate, the bracket has a pair of holding portions which can hold the two end portions of the tank plate therebetween, and the holding portions have engagement means which is engageable or fittable with the engagement means of the tank plate.

The above-mentioned objects, features and advantages of the present invention will become more apparent upon a reading of the following detailed description with reference to the accompanying drawings.

BRIEF DESCRIPTION OF THE DRAWINGS

FIG. 5 is a perspective view of another embodiment of the heat exchanger mounting bracket;

FIG. 6 is a perspective view of still another embodiment of the heat exchanger mounting bracket;

FIG. 7 is a perspective view of yet another embodiment of the heat exchanger mounting bracket;

DETAILED DESCRIPTION OF THE PREFERRED EMBODIMENTS

Figure 1:
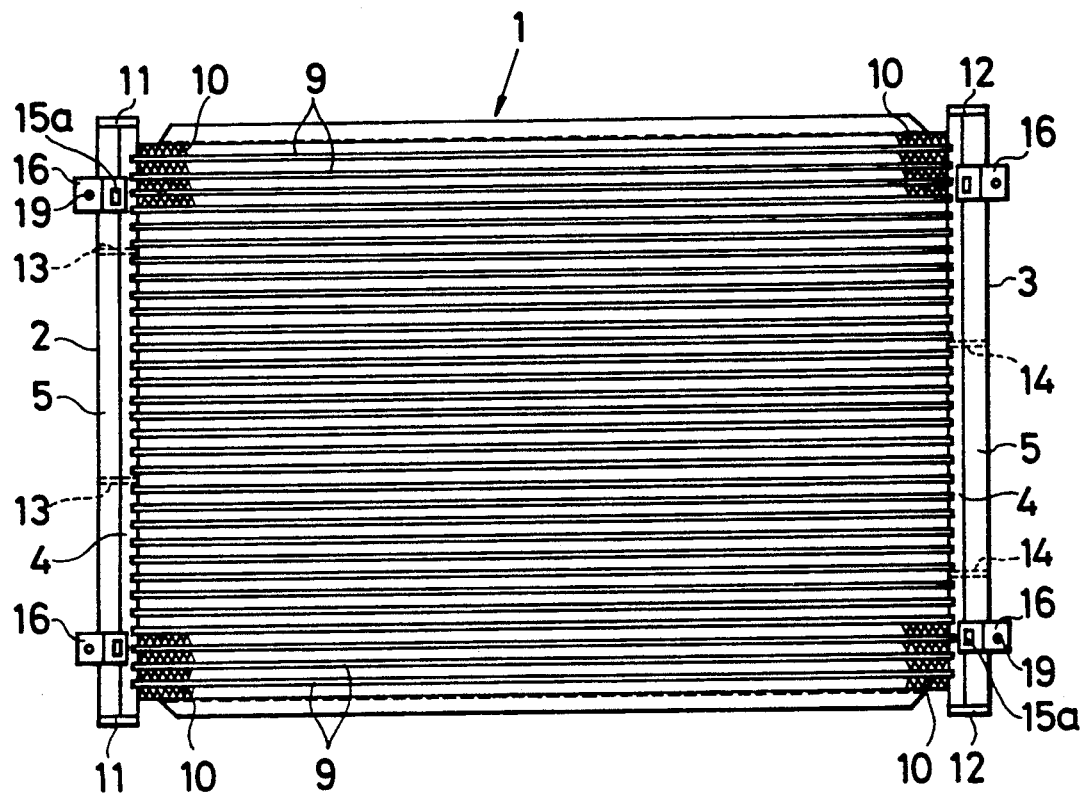
FIG. 1 is a front view of a condition in which the present invention is applied to mounting of a heat exchanger.

Description will be given below of an embodiment of a heat exchanger bracket mounting structure according to the present invention, which is applied to a condenser used in a vehicle air conditioning unit. In FIGS. 1 through 4, reference numeral 1 designates a condenser which is a heat exchanger. The condenser includes a pair of header pipes 2 and 3 respectively disposed on the right and left sides thereof. A refrigerant inlet pipe (which will be described later) is connected to the upper portion of the header pipe 2 and a refrigerant outlet pipe (which will be described later) is connected to the lower portion of the header pipe 3.

The header pipes 2 and 3 are substantially the same in structure. Each of the header pipes 2 and 3 comprises a pair of end plate 4 and tank plate 5, each of which is formed of an aluminum alloy plate material in a trough shape. The end plate 4 and tank plate 5 are made to face each other, the ends thereof are superimposed on each other, and the connection portions 7, 7 thereof are brazed to each other.

For the end plate 4, there is used an aluminum alloy plate member one side face of which is coated with a brazing material. And, the brazing material coated surface is positioned on the inner surface of the end plate 4. Also, for the tank plate 5, there is used an aluminum alloy plate member the inner and outer surfaces of which are both coated with a brazing material.

There are formed a plurality of notches 8 in the mutually opposing peripheral surfaces of the end plates 4, 4, a plurality of flat tubes 9 are respectively inserted into the notches 8, and a radiator fin 10 is interposed between the tubes 9.

The header pipes 2, 3 are closed by caps 11, 12 at the upper and lower ends thereof, respectively. The interiors of each of the header pipes 2, 3 are separated by a plurality of partition plates 13, 14 which causes a refrigerant moving within the tube 9 to meander right and left while it moves from the top of the header pipe toward the bottom thereof.

The tank plate 5 includes on the two ends thereof the above-mentioned connection portions 7, 7 that are respectively bent outwardly. The inner surfaces of the outwardly bent connection portions are superimposed on the outer ends of the end plate 4. Also, at the same height positions of the connection portions 7, 7, there are provided rectangular projections 15a, 15b serving as engagement means for the tank plate 5, and a bracket 16 is mounted to the projections 15a, 15b.

The bracket 16 is formed by bending an aluminum alloy plate member, both sides of which are not coated with a brazing material, in a substantially U shape. The bracket 16 includes a pair of engagement pieces 17, 18 each having a proper elasticity which acts inwardly.

The engagement pieces 17, 18 respectively include a bolt insertion hole 19 which are disposed in the base end portions of the engagement pieces 17, 18, respectively. The engagement pieces 17, 18 further includes in the leading ends thereof holding portions 17a, 18a which respectively spread out outwardly. One of them, namely, the holding portion 17a includes a rectangular engagement hole 20 which is engageable with the projection 15a, that is, the engagement hole 20, which serves as the engagement means of the holding portion 17a.

Also, the other holding portion 18a includes a rectangular notch 21 engageable with the projection 15b, that is, the notch 21 serves as the engagement means of the holding portion 18a. The holding portion 18a further includes, in the positions adjacent to the opening edge thereof, engagement projections 22, 22 which are provided inside of the holding portion 18 respectively and are in engagement with the side end portions of the projection 15b.

Referring now to FIGS. 5 through 15, there are shown other embodiments of the heat exchanger mounting bracket 16. In these figures, the components that correspond to those of the above-mentioned embodiment are given the same designations.

Among them, the bracket 16 shown in FIG. 5 is characterized in that the engagement hole 20 is not formed in a rectangular shape but the engagement hole 20 is increased in aperture from the intermediate portion to the base end portion to thereby give freedom and thus flexibility to the engagement between the hole 20 and projection 15a.

Referring to a bracket 16 shown in FIG. 6, a notch 21 is formed in one holding portion 17a and only engagement projections 22, 22 are provided in the other holding portion 18a. Also, only the projection 15a is provided in the connection portion 7 of the tank plate 5. Due to this, the structures of the tank plate 5 and bracket 16 can be made compact.

And, according to one aspect of the bracket 16 shown in FIG. 6, when securing the bracket 16 to the header pipes 2, 3 provisionally, the notch 21 is engaged with the projection 15a and the projections 22, 22 are respectively engaged with the side end portions of the connection portion 7, so that the provisionally securing operation can be simplified.

Figure 8:
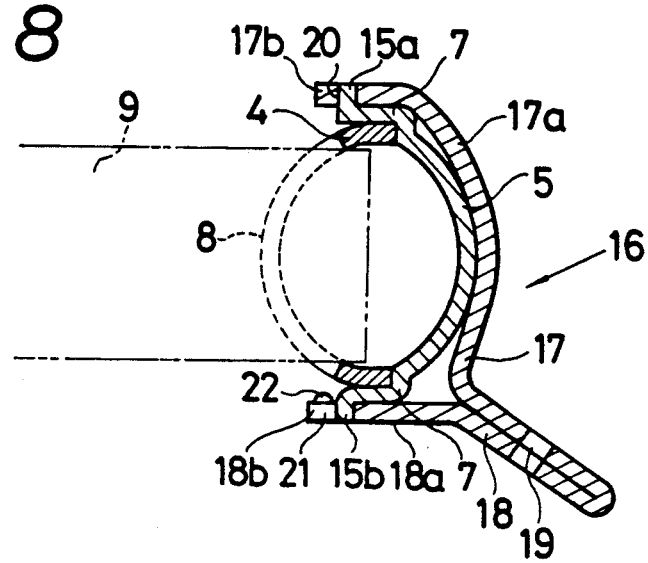
FIG. 8 is a section view taken along the line VIII—VIII shown in FIG. 7.

Referring now to a bracket 16 shown in FIGS. 7 and 8, instead of constructing the engagement pieces 17, 18 symmetrically, the holding portions 17a, 18a are formed such that they are different in section from each other, the base end portions of the engagement pieces 17, 18 are superimposed on each other, and the superimposed portion is projected obliquely and outwardly from the end portion of the tank plate 5, so that the heat exchanger 1 can be mounted from the diagonally front or back position of the two ends thereof.

Also, a pair of tongue pieces 17b, 17b are projectingly provided in the side end portions of the holding portion 17a and engagement holes 20, 20 are respectively formed in the tongue pieces 17b, 17b. Similarly, a pair of tongue pieces 18b, 18b are provided in the side end portions of the holding portion 18a and notches 21 are respectively formed in the tongue pieces 18b, 18b, while engagement projections 22, 22 are provided in the adjacent positions of the openings of the notches 21, respectively.

And, each pair of projections 15a, 15b are provided in the upper and lower positions of the connection portions 7, 7. The projections 15a, 15a are respectively fitted into the engagement holes 20, 20, the projections 15b, 15b are respectively engaged with the notches 21, 21, and the engagement projection 22 is engaged with the side end portion of the connection portion 7, in order to improve the accuracy of positioning of the bracket 16 as well as the strength of provisional securing of the bracket 16.

Figure 9:
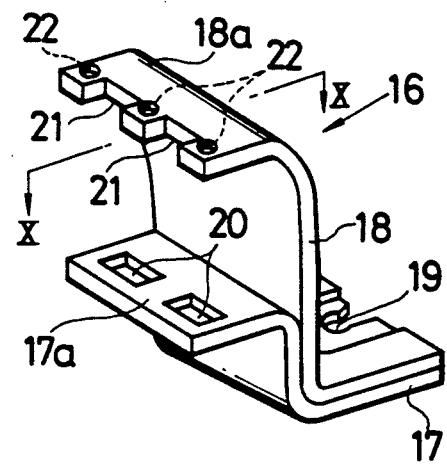
FIG. 9 is a perspective view of a further embodiment of the heat exchanger mounting bracket.
Figure 10:
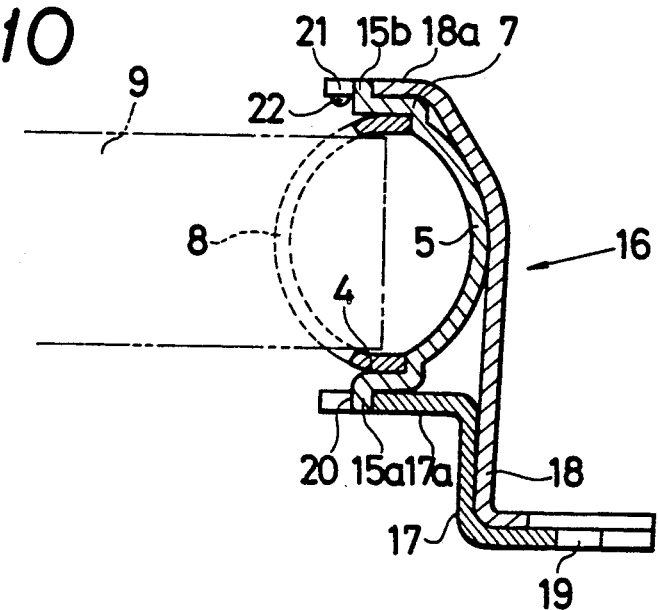
FIG. 10 is a section view taken along the line X—X shown in FIG. 9.

Referring now to a bracket 16 shown in FIGS. 9 and 10, the engagement pieces 17 and 18 are formed of separate members, respectively to thereby facilitate the working thereof. Also, the base end portions of the engagement pieces 17 and 18 are superimposed on each other and the superimposed portions are bent outwardly from the end portion of the tank plate 5, whereby the heat exchanger 1 can be mounted from the diagonally front or rear positions of the two end portions thereof.

And, in the present embodiment, when compared with the bracket 16 shown in FIGS. 7 and 8, the engagement hole 20 and notch 21 are disposed adjacently to each other and the intermediate engagement projection 22 is used in common, so that the structure of the bracket 16 can be simplified and minimized.

Figure 11:
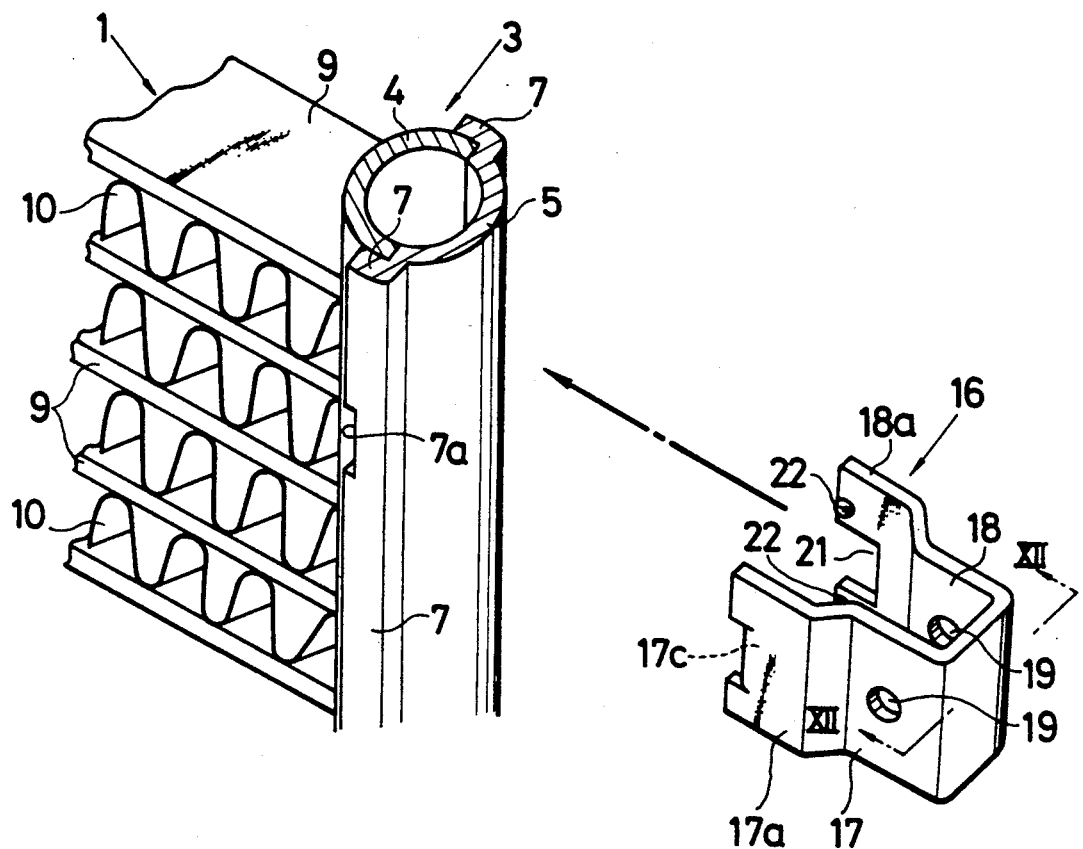
FIG. 11 is an exploded perspective view of a heat exchanger mounting bracket, which is different in structure from those mentioned above, and a heat exchanger corresponding to the bracket.
Figure 12:
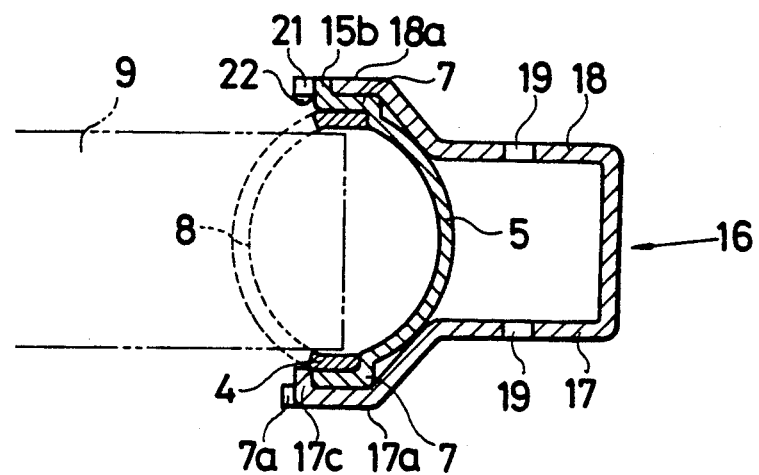
FIG. 12 is a section view taken along the line XII—XII shown in FIG. 11.

Now, in FIGS. 11 and 12, there is shown a further embodiment of a bracket 16 according to the invention. In this embodiment, as the engagement means of the tank plate 5, instead of the projection 15a, there is formed in the connection portion 7 a recess 7a including an engagement groove.

In the bracket 16, as the engagement means of the holding portion 17a, the side end portion of the holding portion 17a is cut and raised inwardly to thereby provide an engagement piece 17c, and the engagement piece 17c is engaged with the recess 7a and the leading end portion of the engagement piece 17c is engaged with the side end portion of the connection portion 7, so that the provisionally securing operation can be performed easily and quickly.

Figure 13:
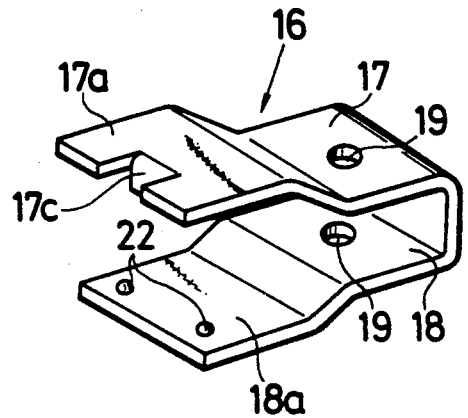
FIG. 13 is a perspective view of a modification of the bracket shown in FIG. 11.

Referring now to the bracket 16 shown in FIG. 13, in the bracket 16 shown in FIGS. 11 and 12, there is omitted the notch 21 formed in the holding piece 18a to thereby simplify the structure of the bracket 16. At the same time, there is omitted the projection 15b formed in the one of the connection portions 7 to thereby simplify the structure thereof.

Figure 14:
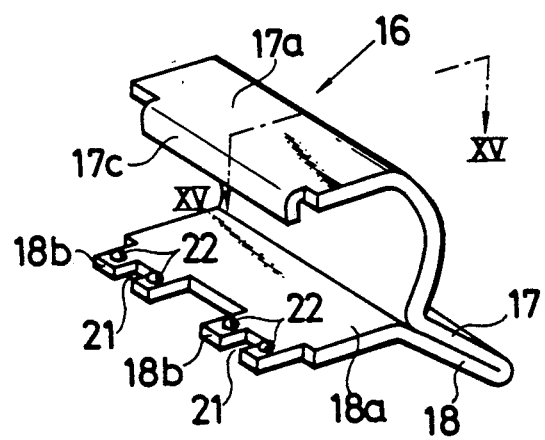
FIG. 14 is a perspective view of another modification of the bracket shown in FIG. 11.
Figure 15:
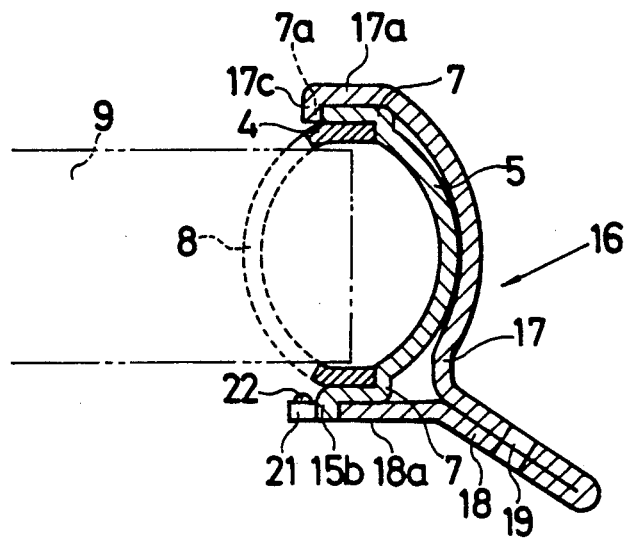
FIG. 15 is a section view taken along the line XV—XV shown in FIG. 14.

Referring next to the bracket 16 shown in FIGS. 14 and 15, in the bracket 16 shown in FIGS. 11 and 12, the tongue piece 17b formed in the holding portion 17a and the engagement hole 20 are omitted and the engagement piece 17c is formed in the side end portion of the holding portion 17a to thereby simplify the structure of the bracket 16. At the same time, the projections 15a, 15a provided in one of the connection portions 7 are omitted to thereby simplify the structure of the tank plate 5.

As a modification of the embodiments shown in FIGS. 11 to 15, the recess 7a may be formed in the connection portions 7, 7 of the tank plate 5 and also the engagement piece 17c may be provided in both of the holding portions 17a, 18a of the bracket 16.

Referring now to FIGS. 16 to 22, there is shown another embodiment of the heat exchanger bracket mounting structure according to the invention, which is different from the above-mentioned embodiment. That is, in the present embodiment, the invention is applied to a case where pipes such as a refrigerant pipe and the like provided in the heat exchanger 1 are mounted. The main portions of the present embodiment are substantially the same as those of the above-mentioned embodiment in structure.

Figure 16:
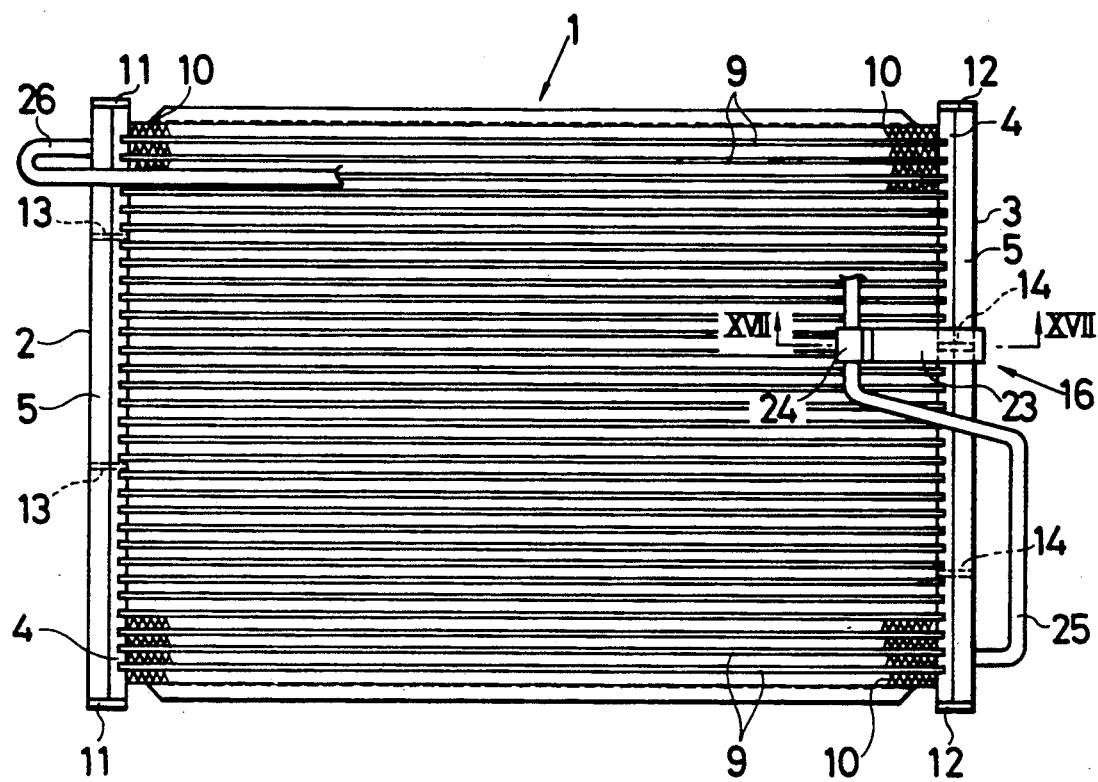
FIG. 16 is a front view of a condition to which the invention is applied to mounting of pipes of a heat exchanger.
Figure 17:
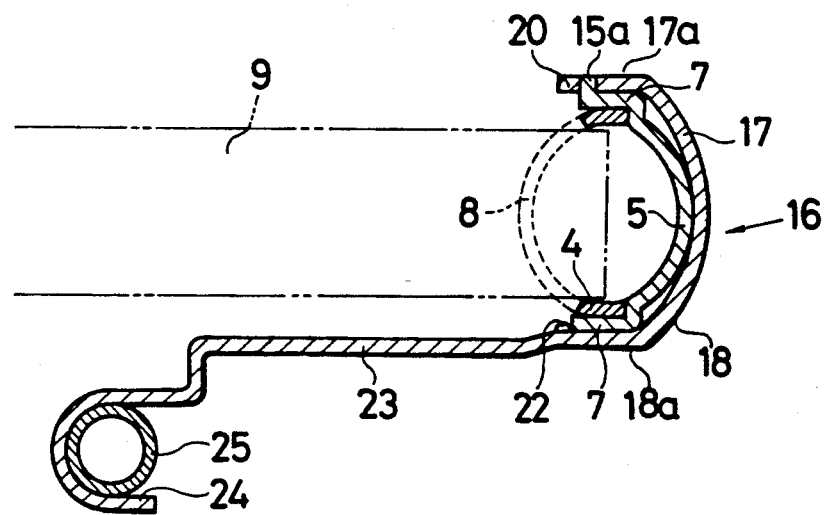
FIG. 17 is a section view taken along the line XVII—XVII shown in FIG. 16.
Figure 18:
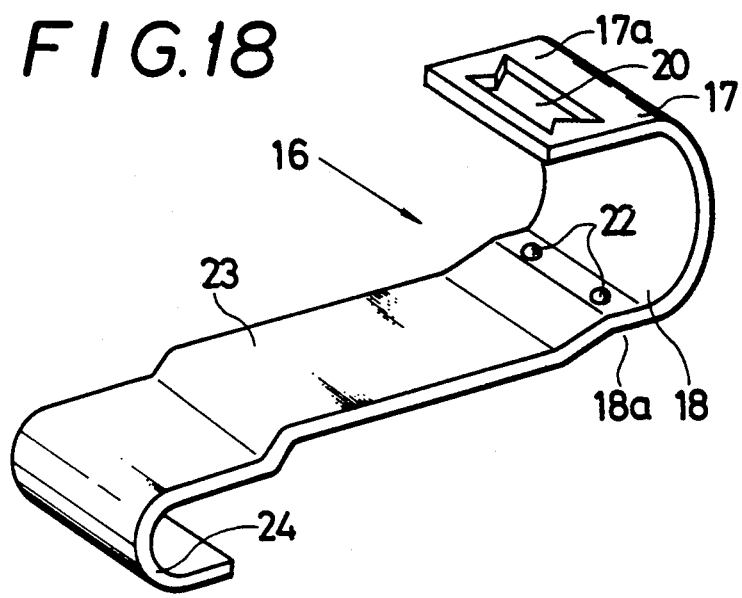
FIG. 18 is a perspective view of a pipe mounting bracket shown in FIG. 16.

In a pipe mounting bracket 16 shown in FIGS. 16 to 18, the bolt insertion hole 19 is omitted, the base end portions of the engagement pieces 17, 18 are gently curved to thereby provide a substantially c-shaped section, and the curved portion is disposed along the outer peripheral surface of the tank plate 5 and is then brazed thereto.

And, there is formed in the holding portion 17a an engagement hole 20 which is fittable with the projection 15a. Also, a pair of engagement projections 22 are provided on the inside of the holding portion 18a in such a manner that they are engageable with the side end portion of the tank plate 5. Therefore, in this case, the projection 15b is omitted.

On the other hand, the holding portion 18a is extended substantially linearly in the bending direction thereof to provide an extended portion 23. The extended portion 23 is positioned before or after the heat exchanger 1 and the leading end thereof is curling formed to thereby provide a conduit holding portion 24. The bracket 16 is arranged such that it has a substantially Z-shaped section and at the same time the conduit holding portion 24 is made to hold therebetween a refrigerant conduit 25 which is located on the outlet side.

In other words, thanks to the above structure, the pipe mounting bracket 16 can be mounted integrally to the header pipe 3 and, in this mounting operation, the positioning and provisional securing of the bracket 16 can be achieved with ease and with accuracy.

In the present embodiment, it is also possible to provide in the heat exchanger 1 both the pipe mounting bracket 16 and heat exchanger mounting bracket 16. Also, the pipe mounting bracket 16 can be applied to a refrigerant conduit 26 which is located on the inlet side.

It should be noted here that the conduit holding portion 24 can be omitted and, instead of it, a separate conduit holding metal member may be mounted to the leading end of the extended portion 23.

Figure 19:
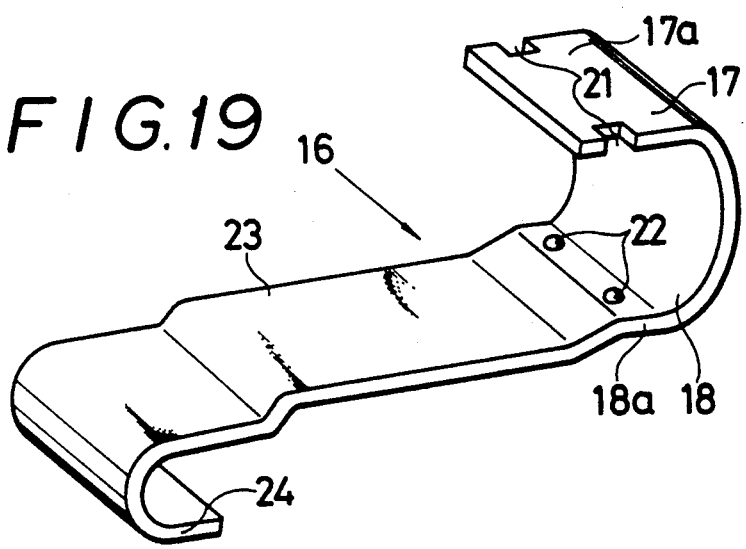
FIG. 19 is a perspective view of another embodiment of the pipe mounting bracket.

According to the bracket 16 shown in FIG. 19, instead of the engagement hole 20, there are formed a pair of notches 21 in the side end portions of the bracket 16 and the notches 21 are then engaged with a pair of projections 15b which are provided in the connection portion 7, thereby improving the accuracy of positioning of the bracket 16 with respect to the header pipe 3.

Figure 20:
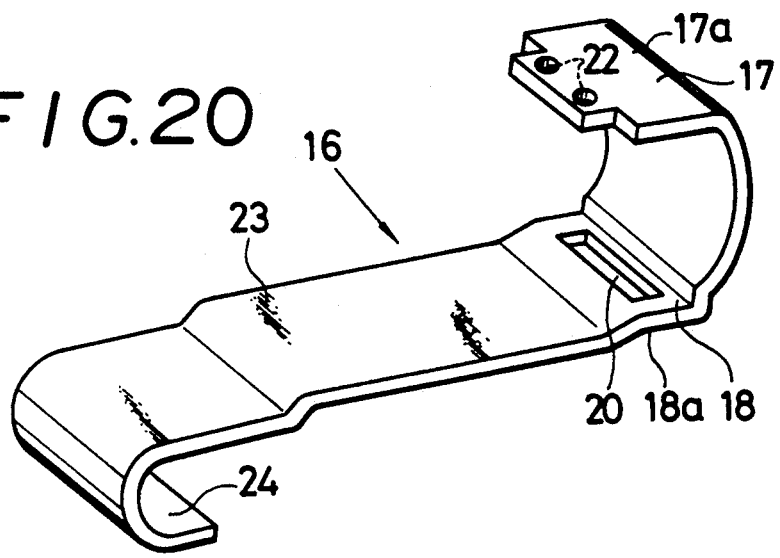
FIG. 20 is a perspective view of still another embodiment of the pipe mounting bracket.

In the bracket 16 shown in FIG. 20, instead of the engagement projections 22, there is formed an engagement hole 20 and, instead of the above-mentioned notches 26, 26, there are provided a pair of engagement projections 22 in the inside of the bracket. Then, the projections 22 are engaged with the side end portion of the connection portion 7. According to the present embodiment, the engagement hole 20 and engagement projections are reversed in position when compared with FIG. 18.

Figure 21:
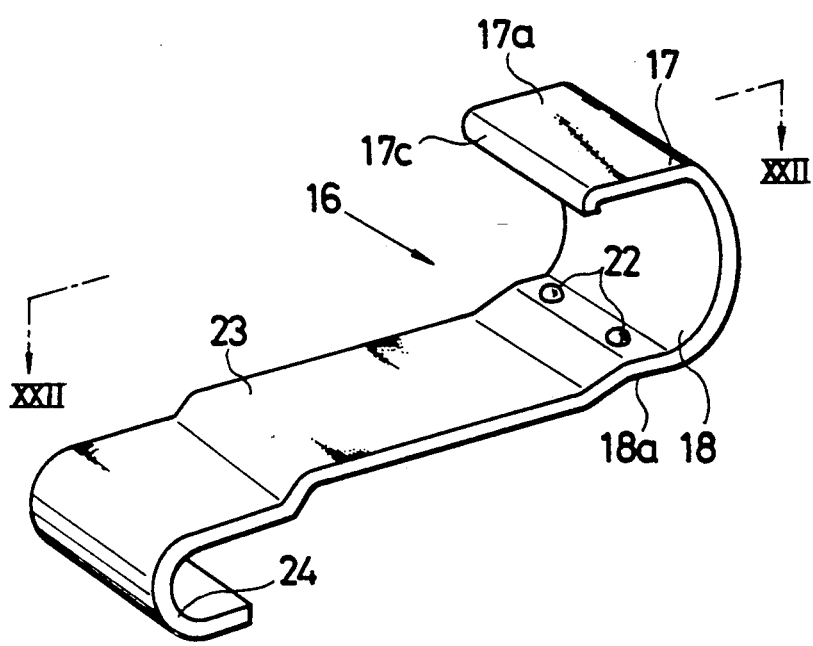
FIG. 21 is a perspective view of yet another embodiment of the pipe mounting bracket.
Figure 22:
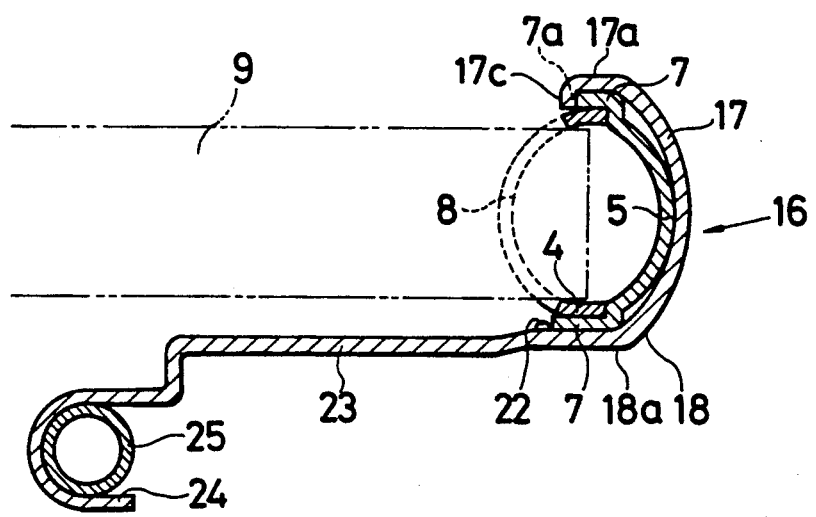
FIG. 22 is a section view taken along the line XXII—XXII shown in FIG. 21.

According to the bracket 16 shown in FIGS. 21 and 22, the engagement hole 20 in the holding portion 17a is omitted and the edge of the holding portion 17a is folded inwardly to provide an engagement piece 17c. The engagement piece 17c is engaged with a recess 7a which is formed in the side end portion of one of the connection portions 7.

Therefore, the connection portion 7 does not require the projections 15a, 15b, which enables the structure of the tank plate 5 to be simplified. Also, due to elimination of the engagement hole 20, the structure of the holding portion 17a can be simplified.

Now, in the above-mentioned embodiments of the invention, the tank plate 5 is formed of a plate member of an aluminum alloy with both surfaces thereof coated with a brazing material and the bracket 16 is formed of a plate member of an aluminum alloy with no surfaces thereof coated with a brazing material. Alternatively, however, they may be constructed in the following manner:

That is, the tank plate 5 may be formed of a plate member of an aluminum alloy with one surface thereof coated with a brazing material and the coating surface of a brazing material may be disposed on the inner surface of the tank plate 5. And, the bracket 16 may be formed of a plate member of an aluminum alloy with one or both surfaces thereof coated with a brazing material and, when the one surface is coated with a brazing material, then the coating surface of a brazing material may be disposed on the inner surface of the bracket 16.

In this case, similarly to the above-mentioned embodiments, the end plate 4 may be formed of a plate member aluminum alloy with one surface thereof coated with a brazing material and the coating surface of a brazing material may be disposed on the inner surface of the end plate 4.

The bracket mounting structure of the invention constructed in the above-mentioned manner, when it is enforced, requires previous machining of the tank plate 5 as well as previous production of the bracket 16.

In particular, to form the tank plate 5, a plate member of an aluminum alloy with at least one surface thereof coated with a brazing material is press formed in a trough shape, the coating surface of a brazing material is disposed on the outer surface of the tank plate 5 and, at predetermined positions in one or both of the connection portions 7, the projections 15a, 15b or recess 7a may be formed by press forming or the like.

For example, in the embodiments respectively shown in FIGS. 1~5 and FIGS. 7~10, the projections 15a, 15b are provided in both of the connection portions 7, 7, while in the embodiments shown in FIGS. 11~21 the projection 15a or 15b is provided in one of the connection portions 7.

Among the above embodiments, in the embodiments respectively shown in FIGS. 11~15 and FIGS. 21~22, the recess 7a is formed in one of the connection portions 7.

Referring to the bracket 16, when the tank plate 5 is constructed in the above-mentioned manner, as a material for the bracket 16, there is used a plate member of an aluminum alloy with neither of the surfaces thereof coated with a brazing material. On the other hand, when the tank plate 5 is formed in such a manner that the coating surface of a brazing material does not exist on the outer surface of the tank plate 5, as a material for the bracket 16, there is used a plate member of an aluminum alloy with one surface thereof coated with a brazing material and the bracket 16 is formed in such a manner that the coating surface of a brazing material does not exist on the inner surface of the bracket 16.

And, when forming the bracket 16, one or more plate members each of an aluminum alloy are press formed integrally or separately, the main portions thereof are formed so as to have a substantially U-shaped or c-shaped section or are connected together to thereby provide a pair of engagement pieces 17, 18, the engagement pieces 17, 18 are respectively given proper elasticity which acts inwardly, and the holding portions 17a, 18a are respectively disposed in the end portions of the engagement pieces 17, 18 in such a manner that they are disposed at mutually opposing positions.

For example, in the embodiment, the engagement pieces 17, 18 are produced separately, while in other embodiments they are formed integrally.

And, in at least one of the holding portions 17a, 18a, there is formed an engagement hole 20 or notch 21 or an engagement piece 17c and, in the other holding portion, there is press formed at least an engagement projection 22.

For example, in the embodiments respectively shown in FIGS. 1~5 and FIGS. 7~10, the engagement hole 20 and notch 21 are formed in both of the holding portions 17a, 18a. In the embodiments respectively shown in FIGS. 6 and 19, the notches 21, 27 are formed in one (17a) of them. In the embodiments respectively shown in FIGS. 11, 12 and FIGS. 14, 15, the engagement piece 17c and notch 21 are formed in both of the holding portions 17a, 18a. In the embodiment shown in FIGS. 21, 22, the engagement piece 17c is provided in one (17a) of them. In the embodiments respectively shown in FIGS. 16~18, and FIG. 20, the engagement hole 20 is formed in the holding portion 17a or in the holding portion 18a.

As can be understood easily from the above description, the heat exchanger mounting bracket and pipe mounting bracket, although the applications thereof are different from each other, are essentially the same in the structure of the main portions thereof and, therefore, part of the components thereof such as a metal mold, jig and the like can be used in common when the brackets are produced.

In this case, the pipe mounting bracket, when compared with the heat exchanger mounting bracket, further requires the manufacture of the extended portion 23 and conduit holding portion 24.

Now, description will be given below of a case where the bracket 16 is positioned and is further secured provisionally by use of the tank plate 5, bracket 16 and the like produced in the above-mentioned manner, by way of the embodiment shown in FIGS. 1~4.

Figure 2:
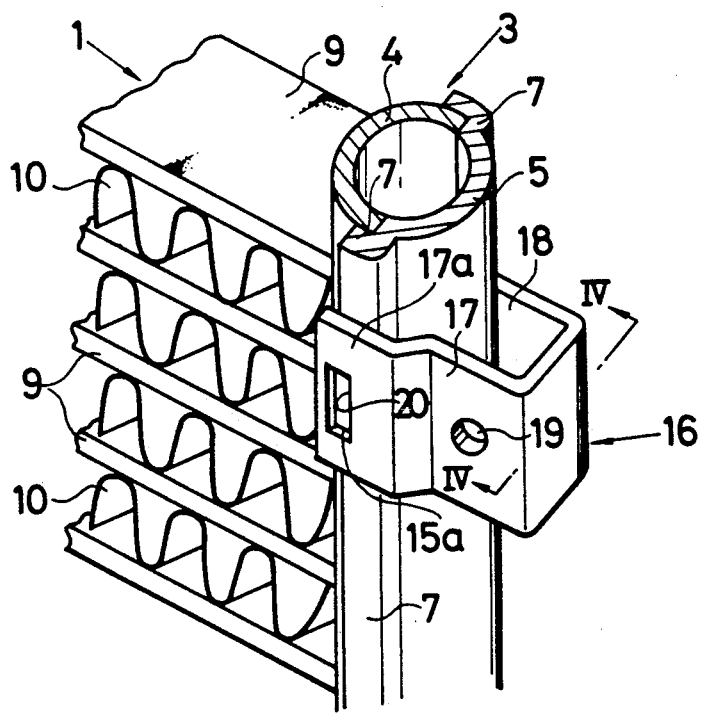
FIG. 2 is a perspective view of main portions of the condition shown in FIG. 1.

At first, a pair of end plates 4 and a tank plate 5 are prepared. Then, the both ends of the end plates 4 are inserted into the inner surfaces of the connection portions 7, 7 of the tank plate 5 and are assembled as shown in FIGS. 2 and 3.

Figure 3:
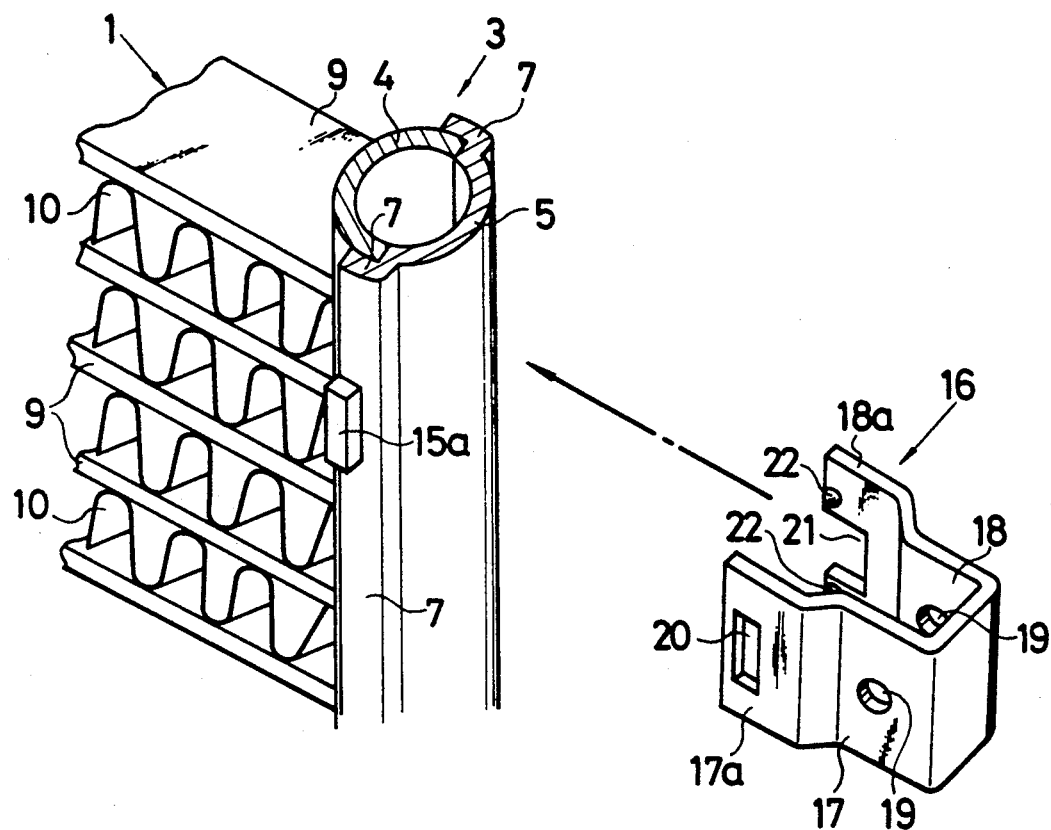
FIG. 3 is an exploded perspective view of a heat exchanger and a heat exchanger mounting bracket which are main parts of FIG. 2.
Figure 4:
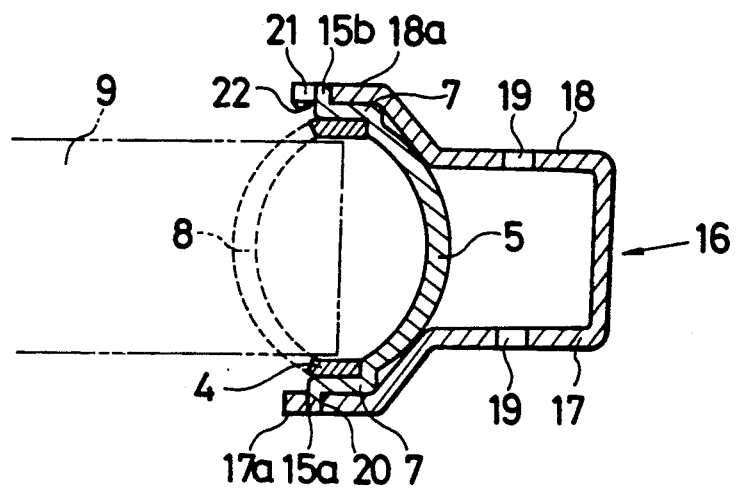
FIG. 4 is a section view taken along the line IV—IV in FIG. 2.

Next, as shown in FIG. 3, the bracket 16 is fitted over the assembly from outside of the tank plate 5.

In this fitting operation, the engagement hole 20 is firstly fitted over the projection 15a and one end of the engagement piece 17 is positioned. After then, the leading end portion of the engagement piece 18 is slightly spread open with the projection 15a as a fulcrum to thereby insert the notch 21 from the side of the projection 15b.

And, the notch 21 is pressed in sufficiently to thereby bring the engagement projections 22, 22 into engagement with the side portions of the connection portions 7 located adjacently to the projection 15b.

According to this structure, one end of the engagement piece 17 can be held due to the engagement between the engagement hole 20 and the projection 15a, the engagement piece 18 can be held due to the engagement between the notch 21 and the projection 15b, and the engagement projections 22, 22 are engaged with the side end portions of the connection portion 7, so that there is obtained an effect to prevent the engagement piece 18 from slipping out of place and thus the bracket 16 can be positioned at a fixed position in the header pipe 3 with accuracy.

In addition to this, due to the fact that the engagement pieces 17, 18 respectively have a proper elasticity acting inwardly and thus the holding portions 17a, 18a which are the leading portions of the pieces 17, 18 are allowed to press against the connection portions 7, 7, the bracket 16 can be provisionally secured with great strength.

On the other hand, since the connection portions 7, 7 push the two ends of the end plate 4 inwardly to thereby attach the end plate 4 tightly, the header pipe 2, 3 can be assembled integrally.

In this case, for example, like the brackets 16 respectively shown in FIG. 6, FIGS. 18~20, even when the engagement hole or notch is formed only in one (17a) of the holding portions, the engagement hole or notch can be fitted or engaged with the projection to thereby position this holding portion 17a at a fixed position in the tank plate 5, and the engagement projections 22 provided in the other holding portion can be engaged with the side portion of the connection portion 7 to thereby prevent the other holding portion from shifting out of position.

And, the above-mentioned positions can be kept with great strength because the holding portion presses against the two end portions of the tank plate 5 due to its own elasticity, so that there can be provided an expected provisional securing effect.

Also, like the brackets 16 respectively shown in FIGS. 11~15, FIGS. 21~22, when the bracket 16 includes the engagement piece 17c in one holding portion and the engagement projection 22 in the other holding portion, the engagement piece 17c is engaged with the engagement groove 7a of the connection portion 7 to thereby position the associated holding portion at a fixed position in the tank plate 5, and the engagement projections 22 provided in other holding portion are engaged with the side end portion of the connection portion 7 to thereby prevent the other holding portion from shifting out of position.

And, these positions can be kept with great strength because the holding portions press against the end portions of the tank plate 5 due to their own elasticity, thereby providing an expected provisional securing effect.

As has been described heretofore, according to the invention, due to the fact that the bracket 16 can be provisionally secured at the fixed positions in the header pipes 2, 3 with accuracy and with great strength and at the same time the provisional securing of the end plate 4 and tank plate 5 can also be achieved, thereby eliminating the need for provision of positioning parts such as jig and the like that are necessary in the conventional mounting structure, and at the same time there is eliminated the need for provision of provisional securing parts such as a clip and the like for holding the two plates 4, 5. This avoids a conventional complicated operation to be performed using these parts and also this kind of operation can be carried out easily and quickly.

Then, after the end plate 4, tank plate 5 and bracket 16 are provisionally secured, the caps 11, 12 are fitted over the top and bottom portions of the header pipes 2, 3, respectively. Also, the tubes 9 are inserted into the notches 8, 8 formed in the end plates 4, 4, the radiator fins 10 are interposed between the tubes 9, and these components are provisionally secured by use of suitable means such as a clip and the like. Thereafter, the provisionally secured components are put into a brazing furnace and the components are brazed together at the predetermined positions thereof.

In other words, the end plate 4 and tank plate 5 are brazed to each other through the inner surfaces of the connection portions 7, 7, and the leading end portions of the engagement pieces 17, 18 and the connection portions 7, 7 are brazed to each other through the outer surfaces of the connection portions 7, 7.

At the same time, the projection 15a is brazed to the engagement hole 20 through the entire peripheral surface of the projection 15a and the projection 15b is brazed to the notch 21 through their contact surfaces.

Here, it should be noted that, in the bracket 16 having the engagement piece 17c, in addition to the above brazing, the inner surface of the engagement piece 17c is brazed to the tank plate 5 and end plate 4 both of which adjoin the piece 17c inner surface.

After completion of the above-mentioned brazing operations, the heat exchanger 1 is taken out from the brazing furnace and the clips used are removed.

In this case as well, since no clip is used in the peripheries of the header pipes 2, 3 and bracket 16, there is reduced the time and labor to remove such clips as are necessary in the conventional structures.

Referring to the bracket 16 brazed in this manner, when it is used to mount a heat exchanger, bolts may be inserted into the bolt insertion hole 19 and fitting metal members (not shown) disposed on the side where the heat exchanger 1 is installed, and then the bolts may be tightened by use of nuts and the like.

Also, when the bracket 16 is used to mounting pipes, the conduit 25 may be fitted into the conduit holding portion 24 and then may be held therebetween.

What is claimed is:

1. In a heat exchanger bracket mounting structure in which a plurality of radiator fins 10 are respectively interposed between a plurality of tubes 9, having a first end and a second end connected to header pipes 2, 3 and a bracket 16 mounted to header pipes 2, 3, the improvement comprising the following structures:
   each of said header pipes 2, 3 is composed of a trough-shaped tank plate 5 and a trough-shaped end plate 4;
   each of said header pipes 2, 3 is constructed by putting said tank plate 5 having two end portions 7 and said end plate 4 having two end portions face to face with each other and then by connecting said two end portions of said tank plate 5 to the outer surfaces of said two end portions of said end plate 4;
   said tank plate 5 includes engagement means on at least one of said two end portions 7 thereof;
   a bracket 16 mounted to said two end portions 7 of said tank plate 5 disposed on the outside of each of said header pipes 2, 3;
   said bracket 16 has a main portion which has a substantially U- or C-shaped section;
   said bracket 16 includes a pair of engagement pieces 17, 18 each having an inwardly biasing elasticity;
   said engagement pieces 17, 18 respectively include holding portions 17a, 18a which are able to hold therebetween said engagement means and said two end portions 7 of said tank plate 5; and
   at least one of said holding portions 17a, 18a include engagement projections 22 which is engageable or fittable on a terminal end of one of said two end portions of said tank plate 5.

2. A heat exchanger bracket mounting structure as set forth in claim 1, wherein said bracket 16 is a heat exchanger mounting bracket.

3. A heat exchanger bracket mounting structure as set forth in claim 2, wherein said heat exchanger mounting bracket 16 includes bolt insertion holes 19 in said engagement pieces 17, 18.

4. A heat exchanger bracket mounting structure as set forth in claim 1, wherein said bracket 16 is a pipe mounting bracket.

5. A heat exchanger bracket mounting structure as set forth in claim 3, wherein said pipe mounting bracket 16 includes an extended portion 23 which is continuously extended from one of said holding portions and a conduit holding portion 24 which is provided in the end portion of said extended portion 23.

6. A heat exchanger bracket mounting structure as set forth in claim 1, wherein means for connecting said two end portions of said end plate 4 and said tank plate 5 to each other is brazing.

7. A heat exchanger bracket mounting structure as set forth in claim 1, wherein means for connecting said header pipes 2, 3 to said bracket 16 is brazing.

8. A heat exchanger bracket mounting structure as set forth in claim 6 or 7; wherein said end plate 4, tank plate 5 and bracket 16 are respectively formed of a plate member of an aluminum alloy, a brazing material coated surface is provided on the inner surface of said end plate 4, two brazing material coated surfaces are respectively provided on the inner and outer surfaces of said tank plate 5, but no brazing material coated surface is provided on the inner and outer surfaces of said bracket 16.

9. A heat exchanger bracket mounting structure as set forth in claim 6 or 7; wherein said end plate 4, tank plate 5 and bracket 16 are respectively formed of a plate member of an aluminum alloy, a brazing material coated surface is provided on the inner surface of said end plate 4, a brazing material coated surface is provided on at least inner surface of said tank plate 5, and said brazing material coated surfaces are positioned on an inner surface of said bracket 16.

10. A heat exchanger bracket mounting structure as set forth in claim 1, wherein said engagement means on said two end portions 7 on said tank plate comprises projections 15a, 15b.

11. A heat exchanger bracket mounting structure as set forth in claim 10; wherein both of said two end portions 7 of said tank plate include projections 15, 15b.

12. A heat exchanger bracket mounting structure as set forth in claim 10; wherein said holding portions 17a, 18a includes an engagement hole 20 or notch 21 which are engageable with said projections 15a, 15b.

13. A heat exchanger bracket mounting structure as set forth in claim 12, wherein said engagement hole 20 is formed in one of said holding portions and said notch is formed in the other holding portion.

14. A heat exchanger bracket mounting structure as set forth in claim 12, wherein said engagement hole 20 or said notch 21 is formed in one of said holding portions.

15. A heat exchanger bracket mounting structure as set forth in claim 10, wherein said holding portions 17a, 18a comprises an engagement piece 17c which is engageable with said recess 7a.

16. A heat exchanger bracket mounting structure as set forth in claim 15, wherein said engagement piece 17c is provided in one of said holding portions.

17. A heat exchanger bracket mounting structure as set forth in claim 1 wherein said engagement means on said two end portions 7 on said tank plate comprises a recess 7a.

18. A heat exchanger mounting bracket for a header pipe constructed of a tank plate and an end plate comprising:
  (a) a substantially U- or C-shaped body having a first end a second end and an intermediate section disposed between said first end and said second end;
  (b) means disposed on said first end for engaging a portion of a ridge or a projection on one of two end portions of said tank plate of said header pipe;
  (c) projections disposed on said second end for assisting in the securement of said second end around a portion of a ridge or a projection on the other of said two end portions of said tank plate of said header pipe; and
  (d) means disposed in said intermediate section for providing inwardly biasing elasticity for said first end toward said second end and for engaging and biasing at least a portion of the outside surface of said tank plate of said header pipe to tension said first and second ends around said two end portions of said tank plate.

19. The heat exchanger mounting bracket of claim 18 wherein said first end includes an engagement hole for engaging said projection on one of said two end portions of said tank plate of said header pipe.

20. The heat exchanger mounting bracket of claim 18 wherein said first end terminates in an engagement piece for engaging one of said two end portions of said tank plate of said header pipe.

* * * * *